United States Patent [19]

Berkes et al.

[11] Patent Number: 5,514,467
[45] Date of Patent: May 7, 1996

[54] MATERIALS AND STRUCTURE FOR TAPE WITH ENHANCED RELEASE

[75] Inventors: John S. Berkes, Webster; Robert J. Gruber, Pittsford, both of N.Y.

[73] Assignee: Xerox Corporation, Stamford, Conn.

[21] Appl. No.: 845,575

[22] Filed: Mar. 4, 1992

[51] Int. Cl.$^6$ .............................. B32B 5/16; G03G 19/00
[52] U.S. Cl. ................... 428/329; 427/11; 427/165; 428/421; 428/480; 428/694 BB; 430/39; 430/102; 430/106.6; 430/126
[58] Field of Search ...................... 428/480, 329, 428/421, 694, 695, 900, 694 TB, 694 BB; 430/102, 106.6, 39, 126; 427/11, 165

[56] References Cited

U.S. PATENT DOCUMENTS

| | | | |
|---|---|---|---|
| 4,101,686 | 7/1978 | Strella et al. | 427/22 |
| 4,533,596 | 8/1985 | Besselman | 428/341 |
| 4,581,283 | 4/1986 | Tokunaga et al. | 428/216 |
| 4,628,000 | 12/1986 | Talvalkar et al. | 428/341 |
| 4,740,798 | 4/1988 | Shinoazaki | 346/76 PH |
| 4,741,918 | 5/1988 | Nagy De Nagybaczon et al. | 427/11 |
| 4,891,240 | 1/1990 | Ward et al. | 427/11 |
| 4,894,283 | 1/1990 | Wehr | 428/341 |
| 4,894,288 | 1/1990 | Fukuda et al. | 428/422 |
| 4,957,808 | 9/1990 | Arai et al. | 428/262 |
| 4,970,119 | 11/1990 | Koshizuka et al. | 428/411.1 |
| 4,983,445 | 1/1991 | Ueyama | 428/212 |
| 5,026,606 | 6/1991 | Isbrandt et al. | 428/421 |
| 5,035,950 | 7/1991 | Del Rosario | 428/421 |
| 5,083,157 | 1/1992 | Smith et al. | 355/200 |
| 5,110,667 | 5/1992 | Galick et al. | 428/202 |
| 5,118,579 | 6/1992 | Aharoni et al. | 428/422 |

FOREIGN PATENT DOCUMENTS 55-125535  9/1980  Japan.

Primary Examiner—D. S. Nakarani
Assistant Examiner—H. Thi Le
Attorney, Agent, or Firm—Oliff & Berridge; Eugene O. Palazzo

[57] ABSTRACT

A MICR tape allows for the complete release of magnetic material from the tape substrate. This is accomplished by creating a tape with a layered structure including a magnetic layer coated on a polymer layer with a release layer therebetween.

11 Claims, 2 Drawing Sheets

MATERIALS AND STRUCTURE FOR TAPE WITH ENHANCED RELEASE

BACKGROUND OF THE INVENTION

A known arrangement in a printing operation provides for the transfer of a portion of ink from a ribbon to result in a mark or image on a substrate sheet such as paper. Another known arrangement includes the use of paper wherein an impact element causes rupture of encapsulated material for marking the paper.

The process of electrophotographic printing includes charging a photoconductive member to a substantially uniform potential to sensitize the surface thereof. The charged portion of the photoconductive surface is exposed to a modulated light beam, e.g., a laser beam, to discharge selected portions of the charged photoconductive surface to record the desired information thereon. In this way, an electrostatic latent image is recorded on the photoconductive surface. The latent image is developed by bringing developer material into contact therewith. Developer material may be comprised of toner particles adhering triboelectrically to carrier granules. The carrier granules may be magnetic, while the toner particles may or may not contain small amounts of magnetic media in a thermoplastic resin binder. The toner particles are electrostatically attracted from the carrier granules to the latent image, from whence they may be transferred to a substrate. Alternatively, single component or liquid carrier development could be used. Finally, the substrate may be subjected to heat and/or pressure to permanently affix the toner image to the substrate.

Also known are printing inks which contain magnetic particles wherein certain of the particles are transferred to the record media for encoding characters in a manner and fashion so as to be machine-readable in a subsequent operation. One of the best known uses for such encoding systems is in magnetic ink character recognition (MICR).

Electrophotographic printing in concert with the use of MICR technology has been particularly useful in the commercial banking industry by reproducing checks or financial documents with magnetic ink, i.e., by fusing magnetically loaded toner particles thereon. Each financial document has imprinted thereon encoded data in a MICR format. In addition, high speed processing of financial documents is simplified by imprinting magnetic ink bar codes in machine readable form thereon. The repeated processing of the financial documents and the high speed sorting thereof is greatly simplified by the reading of the encoded data by a MICR reader. Thus, encoded information on financial documents may be imprinted thereon xerographically with magnetic ink or toner. The information reproduced on the copy sheet with the magnetic particles may be subsequently read due to its magnetic and optical characteristics.

High speed electrophotographic printing machines have employed magnetic toner particles to develop the latent image. These toner particles have been subsequently transferred to the copy sheet and fused thereto. The resultant document may have variable or fixed magnetic data imprinted thereon in MICR format which is subsequently read by a MICR reader and processed. While the utilization of magnetically encoded information on documents reproduced with magnetic particles is well known, the cost of using magnetic toner as the only developer in a printer is substantial since every copy going through the printer uses up magnetic toner whether the subsequent copy is to be read by MICR reader or not.

Recently, the advent of thermal printing such as in facsimile machines has brought about the requirement for heating of extremely precise areas of the record media by use of relatively high currents. The intense heating of the localized areas causes transfer of ink from a ribbon onto the paper. Alternatively, the paper may be of the thermal type which includes materials which are responsive to the generated heat. The use of thermal printing is adaptable for MICR encoding of documents wherein magnetic particles are caused to be transferred onto the documents for machine reading of the characters. MICR character generation can involve the thermal transfer of a layer of magnetic material to the top of xerographically printed non-magnetic characters. Usually a magnetic tape comprising a substrate layer and a magnetic layer is heated. Upon contact with xerographically printed non-magnetic characters, the xerographically printed characters are softened by the heat, and the magnetic layer of the magnetic tape makes contact to adhere to the surface of the xerographically printed characters, thus magnetizing the characters. These characters can then be read by a machine. A preferred magnetic layer consists of approximately 60% acicular magnetite, 25% styrene, 7% chlorinated rubber, 6% carbon black and a small amount (<1%) of plasticizer % by weight. These constituents are dispersed in a methyl ethyl ketone/toluene solvent and coated onto a 0.5 mil polyethylene terephthalate substrate to produce a 2 to 3 μm thick layer after drying. A critical aspect of this formulation is to provide, within a single layer, a balance of adhesion forces such that the magnetic layer adheres to the toner, releases relatively easily from the PET and does not adhere to the paper.

The compositionally minor constituent (i.e. plasticizer) is the major component responsible for release and for determining the parameters of the tape's use. This fact has most likely been responsible for uncontrolled tape release characteristics which are manifested in high reject rate and process latitude variability.

U.S. Pat. No. 4,894,283 (Wehr) discloses a reusable thermal transfer ribbon with a thermal responsive coating thereon, for use in imaging or encoding characters to be machine read. The thermal transfer ribbon is comprised of three layers: (1) a base or substrate of thin, smooth, tissue-like paper or polyester type plastic or like material; (2) a layer or coating which includes a resin composition which may include polyethylene as an ingredient for use in providing a binding layer; and (3) a functional coating which is thermally activated and includes a nonmagnetic pigment or particles as an ingredient therein for use in imaging or encoding operations to enable machine, human, or reflectance reading of characters or other marks. The functional coating layer has a low cohesion level which allows the splitting of the functional coating during the printing operation in a manner to effect reusable or multiple use of the coating. The binding layer retains a portion of the split functional coating layer for reuse of the same portion of the ribbon.

U.S. Pat. No. 4,533,596 (Besselman) discloses a thermal magnetic transfer ribbon comprised of a tissue- or polyester-type resin to which is added a coating of a magnetic pigment and a resin, oil and wax mixture dispersed in a binder mix. The thermal magnetic ribbon or transfer medium is useful for encoding characters with a magnetic signal inducible ink, thus enabling the characters to be machine read.

U.S. Pat. No. 4,628,000 (Talvalkar et al.) discloses a thermal transfer formulation and medium comprised of a non-crystalline type adhesive-plasticizer or sucrose benzoate transfer agent dispersed in a diluent of ethyl alcohol or like solvent, and a coloring material or pigment. The formulation is coated on a ribbon substrate and provides for thermal printing on any receiving substrate having a substantially smooth surface.

One of the problems with the use of such an approach for MICR character generation is the frequent failure of the layer of magnetic material to readily separate from the substrate or backing layer. Consequently, documents are incompletely coded and cannot be properly machine read. Current toner film tapes for MICR give inconsistent performance and have variable latitudes.

SUMMARY OF THE INVENTION

It is an object of this invention to allow for the complete release of the magnetic layer from a film substrate of a tape, particularly for use in creating magnetic images on existing substantially non-magnetic toner images for use in MICR systems. This is accomplished by creating a tape with a layered structure comprising a magnetic layer coated on a polymer layer, and a release layer therebetween. The separation of functions in the donor film structure provides consistent release characteristics and wide process latitude.

DETAILED DESCRIPTION OF PREFERRED EMBODIMENTS

The present invention relates to a tape with enhanced release capabilities and a method for making the tape. The tape is comprised of at least three layers, including a backing layer, a magnetic layer, and a release layer positioned between the backing layer and the magnetic layer.

Figure 1:
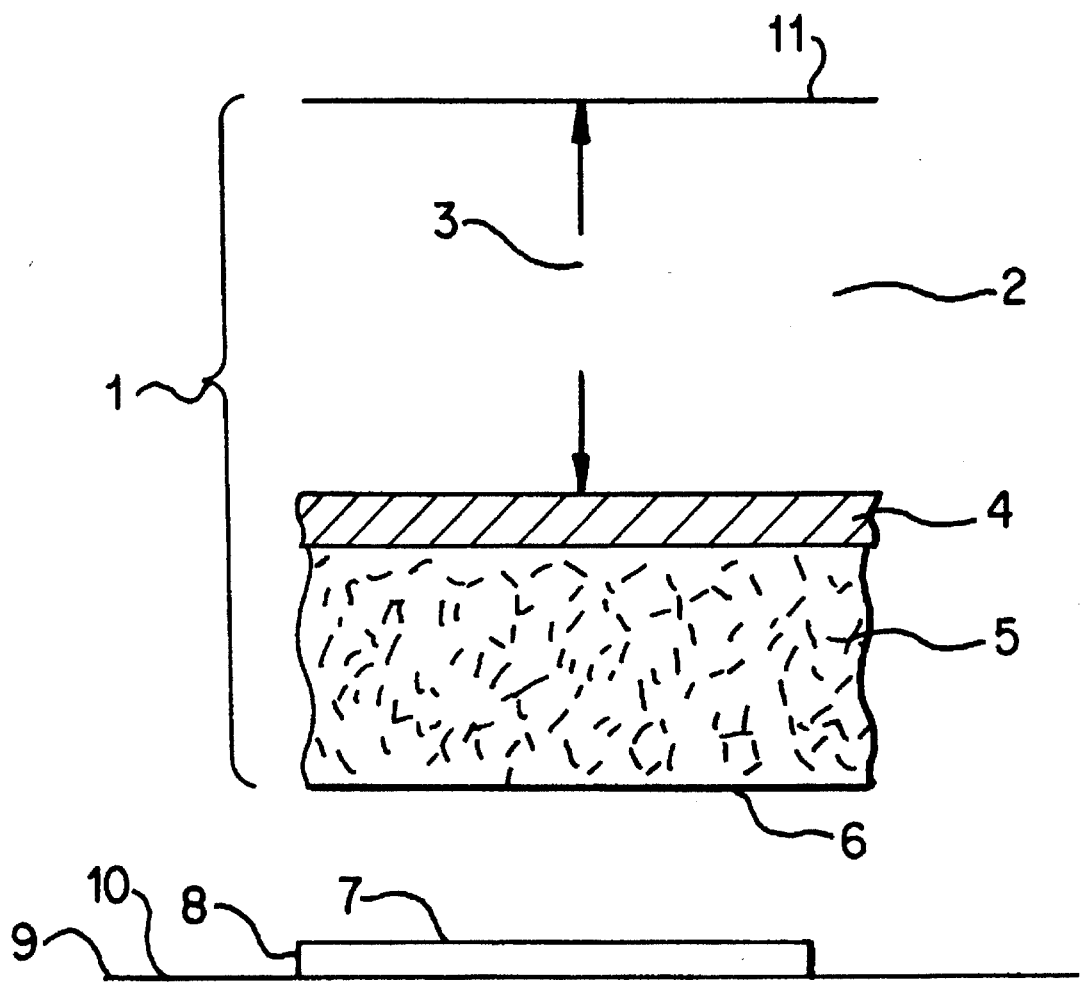
FIG. 1 is a cross section of a MICR imaging tape of the invention.

As shown in FIG. 1, the tape 1 is comprised of a backing layer 2, a release layer 4, and a magnetic layer 5. The backing layer 2 is preferably a polymeric substrate such as polyethylene terephthalate (e.g., Mylar®), having a thickness 3 as represented by the arrows of about 0.3 mil to about 0.5 mil. While Mylar® is a preferred backing layer 2, high melt polymers, especially polyesters, other than Mylar® may be used which allow for the heating of the tape at lower temperatures. These polymers include but are not limited to polyimide, polyether ether ketone, polysulfone, polyethersulfone, polyetherimide and polymethylpentane.

The release layer 4 must be continuous but may be very thin, e.g., about 100 to about 1000 angstrom. The release layer 4 may be made from low surface energy materials like fluorocarbons (e.g., Teflon, Kynar, FEP, etc.) for either low temperature, high temperature and/or pressure transfer. For high temperature transfer, with or without pressure, the release layer 4 may be made from polymeric materials that melt to a low viscosity liquid and thereby provide a weak interface layer. Low molecular weight polyethylenes, such as Polywaxes® which can be obtained from the Petrolite Corporation, are preferred for the release layer 4, since they soften or melt to low viscosity liquids which have good release characteristics. Polywaxes® are crystalline aliphatic hydrocarbons with a molecular weight between 500 to 2000.

A very thin fluorocarbon release layer 4 may be coated onto the backing layer 2 by a triboadhesion process (see U.S. Pat. No. 4,741,918, the entire disclosure of which is hereby incorporated herein by reference). This is a nonsolvent coating process which may be advantageous for coating very thin and uniform polymeric films.

Using this method, the release layer 4 is coated onto the backing layer 2 by rubbing substantially dry discrete particles of the fluorocarbons across the surface of the backing layer 2 with a sufficient rate of energy input to cause them to adhere. Preferably, the fluorocarbon particles are carried on the surface of a soft resilient buffing wheel rotating fast enough to give peripheral speeds of from about 2 to about 200 m/s.

The magnetic layer 5 to be released may be about 1.5 µm to about 3 µm thick and preferably is comprised of a magnetite, preferably ferrosoferric oxide ($Fe_3O_4$), and a polymer. The magnetite may comprise about 50% to about 70% by weight of the magnetic layer, and the polymer may comprise about 30% to about 50% by weight of the same layer. The polymer is usually a resin comprised of styrene, a plasticizer, and/or a chlorinated rubber. However, other resins, including polyesters, may be used.

Typical unsaturated polyester base resins which may be used as the resin in the magnetic layer are prepared by melt polycondensation or other polymerization processes using diacids and/or anhydrides and diols. Suitable diacids and dianyhydrides include but are not limited to saturated diacids and/or anhydrides such as, for example, succinic acid, glutaric acid, adipic acid, pimelic acid, suberic acid, azelaic acid, sebacic acid, isophthalic acid, terephthalic acid, hexachloroendo methylene tetrahydrophthalic acid, phthalic anhydride, chlorendic anhydride, tetrahydrophthalic anhydride, hexahydrophthalic anhydride, endomethylene tetrahydrophthalic anhydride, and the like and mixtures thereof; and unsaturated diacids and/or anhydrides such as for example, maleic acid, fumaric acid, chloromaleic acid, methacrylic acid, acrylic acid, itaconic acid, citraconic acid, mesaconic acid, maleic anhydride, and the like and mixtures thereof. Suitable diols ihclude but are not limited to for example propylene glycol, ethylene glycol, diethylene glycol, neopentyl glycol, dipropylene glycol, dibromoneopentyl glycol, propoxylated bisphenol A, 2,2,4-trimethylpentane-1,3-diol, tetrabromo bisphenol diproxy ether, 1,4-butanediol, and the like and mixtures thereof, soluble in good solvents such as, for example, tetrahydrofuran, toluene and the like.

Preferred unsaturated polyester resins are prepared from diacids and/or anhydrides such as, for example, terephthalic acid, maleic anhydride, fumaric acid, an the like and mixtures thereof, and diols such as, for example, propoxylated bisphenol A, propylene glycol, and the like and mixtures thereof.

Other suitable resins include poly(methyl acrylate), poly(methyl methacrylate), poly(ethyl methacrylate), poly(hydroxy-ethyl methacrylate), poly(2-ethoxyethyl methacrylate), poly(butoxy ethoxyethyl methacrylate), poly(dimethyl amino ethyl acrylate), poly(acrylic acid), poly(methacrylic acid), poly(acrylamide), poly(methacrylamide), poly(acrylonitrile), poly(vinyl chloride) and poly(ureido-ethyl vinyl ether). Other useful thermoplastic resins or polymers include ethylene vinyl acetate (EVA) copolymers (Elvax resins, E.I. du Pont de Nemours and Company, Wilmington, Del.), copolymers of ethylene and an alpha-beta-ethylenically unsaturated acid selected from the group consisting of acrylic acid and methacrylic acid, copolymers of ethylene (80 to 99.9%)/acrylic or methacrylic acid (20 to 0%)/ alkyl(C1 to C5) esters of methacrylic or acrylic acid (0 to 20%), polyethylene, polystyrene, isotactic polypropylene (crystalline), and ethylene ethyl acrylate series sold under the trademark Bakelite® DPD 6169, DPDA 6182 Natural and DTDA 9169 Natural and DQDA 6832 Natural 7 also sold by Union Carbide Corp; Surlyn® ionomer resin by E.I. du Pont de Nemours and Company, Wilmington, Del., or blends thereof, polyvinyl toluene, polyamides, styrene/butadiene copolymers and epoxy resins.

A typical magnetic layer may comprise, for example, 60% $Fe_3O_4$, 24% styrene, 7.3% chlorinated rubber, 6.4% carbon black (or any other colorant), 2% Mirasol® (an epoxy ester resin), and 0.3% Plastoein® (a plasticizer).

The magnetite is released from the release layer 4 when the face 6 of the tape is placed on top of a printed document. Preferably heat, in the range of about 300° F. to about 400° F., is applied to the back 11 of the backing layer 2. The heat is conducted through the backing layer 2 to the release layer 4. The release layer 4, when comprised of low molecular weight polyethylenes, melts to a low viscosity liquid, thereby providing a weak interface layer. In another embodiment of the invention, the release layer, when heated, is softened, not melted, allowing release of the magnetic layer. The heat also melts the polymer in the magnetic layer 5. The face 7 of the toner image 8 also softens because of the application of heat to the back 11 of the backing layer 2. The magnetic layer 5 adheres to the ink or toner of a substrate sheet 9 due to adhesion forces. The magnetic layer 5 does not adhere to the nonprint areas 10 of the substrate sheet 9, in part because there are weak adhesion forces between the substrate 9 and the tape substrate 6, and in part because the tape 1 may not be in contact with the nonprint areas 10 of the substrate sheet 9. It is preferable that the face 6 of the tape 1 only be in contact with the face 7 of the toner image 8, which may sit about 10 microns above the surface of the substrate sheet 9. Because there is a greater surface tension adhesion force between the face 7 of the softened toner image 8 and the magnetic layer 5 than between the release layer 4 and the magnetic layer 5, the magnetic layer 5 adheres to the softened toner image 8.

This invention can be incorporated into the operation of an electrophotographic printing machine.

Figure 2:
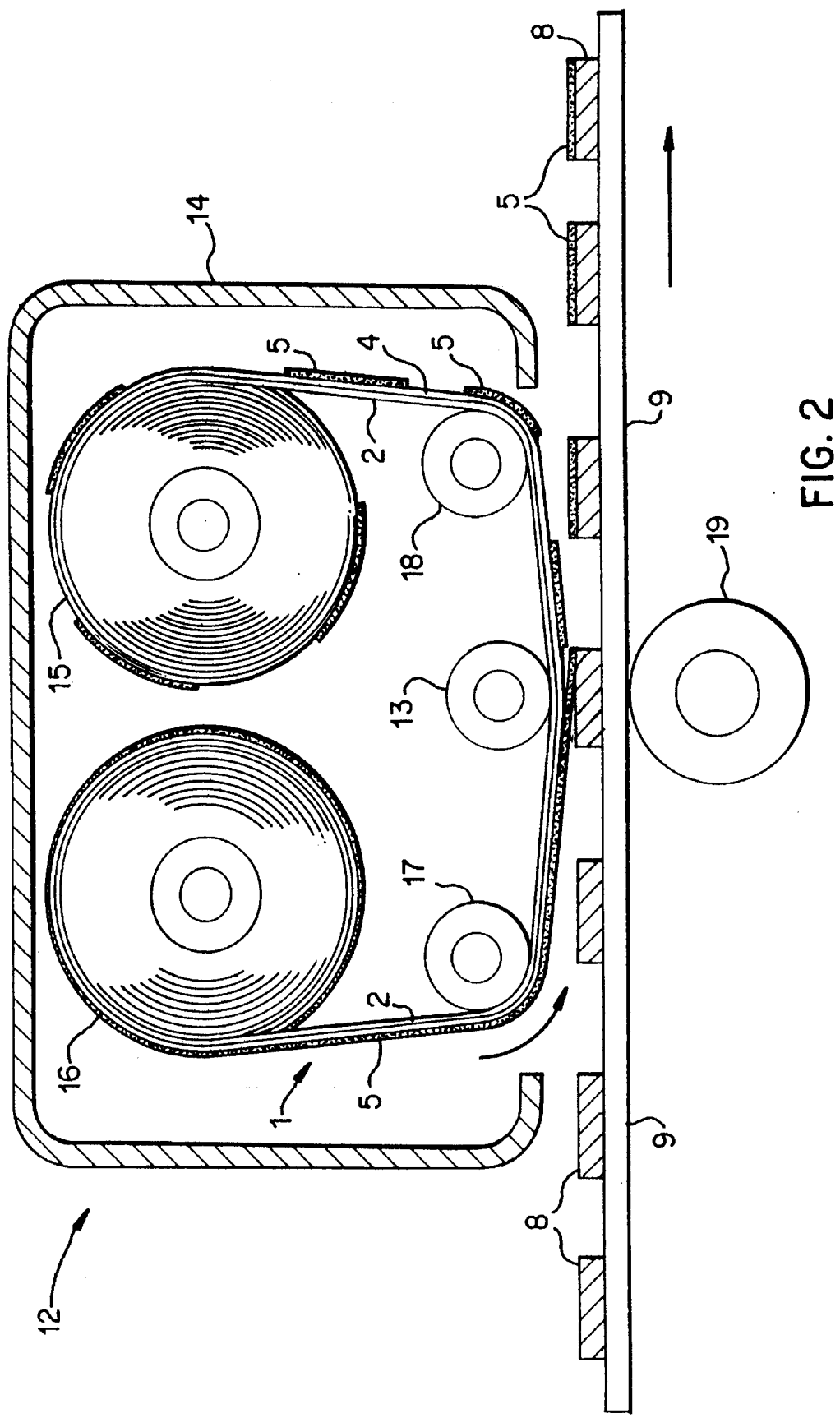
FIG. 2 shows a side view of a device employed in the process of magnetic overcoating onto a non-magnetic toner image.

In reference to FIG. 2, a media applicator 12 is positioned to apply magnetic media to selected parts of substrate sheets 9 after they have exited an electrophotographic printing machine such as a copier. When these sheets 9 contain, for example, four (4) checks on each sheet, the numbers or code along the bottom of any sheet, for example, may be overcoated with a magnetic media which makes the codes machine readable. The checks can now be passed through a machine called a reader-sorter by the ba_nk processing any of the checks with the number and symbols now being recognizable. Colored and magnetic media can also be applied to other image areas of the checks.

Media applicator 12 comprises a conventional fuser roller 13 mounted against back 11 of tape 1. Tape 1 comprises a heat resistant polyester film backing member 2, such as Mylar®, with the magnetite layer positioned to contact substrate sheets adhered to release layer 4. Tape 1 may be contained within a throw-away cassette 14 and wound up onto a pay-out spool 15 and connected to another spool 16. Tape 1 passes tensioning rollers 17 and 18, with fuser roller 13 being positioned between the two spools 15 and 16 facing the backing member 2 and opposite a backup roller 19. Substrate sheets 9 with the codes and symbols desired to be magnetized are located directly below fuser roller 13, which heats and presses tape 1 against previously fused non-magnetic or weakly magnetic (substantially non-magnetic) toner 8. In a preferred embodiment, heat causes the magnetic layer directly over standard toner characters 8 to release from the release layer and adhere to the previously fused characters while the substrate sheet continues en route.

It should be understood that this invention may also be used with a sensing system as disclosed in U.S. Pat. No. 4,891,240 where the code to be magnetized would be sensed, a circular heating shoe rotating at the speed of the substrate sheets would be brought into contact with tape moving at the speed of the sheets and the shoe removed from the film once the code is sensed as having passed the media loading point.

In an alternative embodiment of the invention, pressure without heat may be applied to the tape to encode the non-magnetic toner, depending on the materials in the release layer, the magnetic layer and the non-magnetic toner image. Chemical adhesion and intimate mechanical contact between the magnetic layer and the substantially non-magnetic toner will cause the magnetic layer to selectively adhere only to the toner or other printed matter.

It should be understood that multiple lines of coded material could be magnetized with the present magnetizing process by including large or multiple cassettes of tape. positioned as desired. Further, while the magnetic media applicator is disclosed herein as an on-line device, i.e., one that is connected to and accepts sheets from a copying machine as they leave the copying machine, one can readily see that the media applicator is adaptable to off-line use as well. In short, media applicator 12 is adaptable for both on-line and off-line applications.

Although particular embodiments of the present invention have been described and illustrated herein, it should be recognized that modifications and variations may readily occur to those skilled in the art and that such modifications and variations may be made without departing from the spirit and scope of our invention. Consequently, our invention as claimed below may be practiced otherwise than as specifically described above.

What is claimed is:

1. A tape for transfer of a layer of magnetic material onto toner images comprising:

a backing layer;

a magnetic layer comprising a magnetite and a resin; and a continuous release layer comprising a polymeric fluorocarbon, and having a thickness of about 100 to about 1000 angstroms for release of the magnetic layer from the backing layer, said release layer positioned between said backing layer and said magnetic layer and adhered to said backing layer by rubbing substantially discrete particles of a material comprising the release layer across a surface of the backing layer.

2. The tape of claim 1, wherein said resin comprises a polymeric material, said polymeric material comprising about 30% to about 50% by weight of the magnetic layer.

3. The tape of claim 1, wherein said magnetite is comprised of ferrosoferric oxide ($Fe_3O_4$).

4. The tape of claim 2, wherein said magnetite comprises about 50% to about 70% by weight of the magnetic layer.

5. The tape of claim 1, wherein said magnetic layer further comprises a colorant and a plasticizer.

6. The tape of claim 1, wherein said magnetic layer is about 1 μm to about 3 μm thick.

7. The tape of claim 1, wherein said backing layer comprises a polymer.

8. The tape of claim 7, wherein said polymer comprises polyethylene terephthalate.

9. The tape of claim 1, wherein said polymeric fluorocarbon melts to a liquid of a viscosity to provide a greater surface tension adhesion force between the face of the toner image and the magnetic layer than between the release layer and the magnetic layer.

10. The tape of claim 1, wherein said polymeric fluorocarbon softens at a temperature of between about 300° F. and about 400° F.

11. The tape of claim 1 wherein, upon applying said tape to a substrate sheet having toner-image printed areas and non-printed areas, said magnetic layer has a greater adhesion force to said toner images than to said non-printed areas of said substrate sheet.

\* \* \* \* \*